(12) United States Patent
Frohnapfel et al.

(10) Patent No.: US 10,865,818 B2
(45) Date of Patent: Dec. 15, 2020

(54) GENERALIZED FLOW PROFILE PRODUCTION

(71) Applicants: Dustin J. Frohnapfel, Blacksburg, VA (US); Walter F. O'Brien, Jr., Blacksburg, VA (US); K. Todd Lowe, Blacksburg, VA (US)

(72) Inventors: Dustin J. Frohnapfel, Blacksburg, VA (US); Walter F. O'Brien, Jr., Blacksburg, VA (US); K. Todd Lowe, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 177 days.

(21) Appl. No.: 16/099,389

(22) PCT Filed: May 5, 2017

(86) PCT No.: PCT/US2017/031279
§ 371 (c)(1),
(2) Date: Nov. 6, 2018

(87) PCT Pub. No.: WO2017/192976
PCT Pub. Date: Nov. 9, 2017

(65) Prior Publication Data
US 2019/0085879 A1 Mar. 21, 2019

Related U.S. Application Data

(60) Provisional application No. 62/332,665, filed on May 6, 2016.

(51) Int. Cl.
*F15D 1/00* (2006.01)
*F15D 1/02* (2006.01)
*G01M 9/06* (2006.01)

(52) U.S. Cl.
CPC .............. *F15D 1/001* (2013.01); *F15D 1/02* (2013.01); *F15D 1/025* (2013.01); *G01M 9/065* (2013.01)

(58) Field of Classification Search
CPC .......... F15D 1/0005; F15D 1/001; F15D 1/02; F15D 1/025; G01M 9/065
See application file for complete search history.

(56) References Cited

U.S. PATENT DOCUMENTS 3,250,469 A * 5/1966 Colston ................... F15C 1/146
235/200 PF
4,142,413 A * 3/1979 Bellinga ................. G01F 15/00
73/198

(Continued)

FOREIGN PATENT DOCUMENTS

WO 2015160695 A1 10/2015

OTHER PUBLICATIONS

International Search Report dated Jul. 26, 2017.
International Preliminary Report on Patentability for PCT/US2017/031279.

*Primary Examiner* — Natalie Huls
(74) *Attorney, Agent, or Firm* — Thomas | Horstemeyer, LLP

(57) ABSTRACT

Various examples are provided related to improvements in generalized flow profile production. In one example, a method includes determining a downstream flow profile including a pressure profile and a velocity profile; fabricating a pressure profile generator including distortion screen(s) disposed on a backing structure; fabricating a velocity profile generator including turning vanes in a flow path through the velocity profile generator that are configured to generate the velocity profile; attaching the pressure profile generator to an input side of the velocity profile generator; and installing the flow conditioning device in the (Continued)

flow field of interest. Flow through the flow conditioning device produces the downstream flow profile in the flow field of interest. In another example, a flow conditioning device includes a pressure profile generator with distortion screen(s) disposed on a backing structure; and a velocity profile generator with turning vanes attached to an input side of the velocity profile generator.

20 Claims, 7 Drawing Sheets

(56) References Cited

U.S. PATENT DOCUMENTS

| | | | | |
|---|---|---|---|---|
| 5,495,872 | A * | 3/1996 | Gallagher | F15D 1/025 138/40 |
| 5,762,107 | A * | 6/1998 | Laws | F15D 1/025 138/44 |
| 7,845,688 | B2 * | 12/2010 | Gallagher | F16L 9/147 285/412 |
| 8,485,227 | B2 * | 7/2013 | Chalupa | G01F 1/6842 138/44 |
| 2005/0195521 | A1 | 8/2005 | Alonso et al. | |
| 2006/0068695 | A1 * | 3/2006 | Kelley | H05K 7/20745 454/184 |
| 2008/0037366 | A1 * | 2/2008 | Smith | G01F 15/00 366/337 |
| 2011/0000215 | A1 | 6/2011 | Lacy et al. | |
| 2011/0174408 | A1 * | 7/2011 | Lundberg | F15D 1/001 138/39 |
| 2014/0238025 | A1 * | 8/2014 | Uhm | F23R 3/14 60/737 |
| 2015/0240843 | A1 * | 8/2015 | Sawchuk | G01F 15/00 138/40 |
| 2016/0012159 | A1 | 1/2016 | Ferrar et al. | |
| 2019/0138663 | A1 * | 5/2019 | Ferrar | G06F 30/17 |

* cited by examiner

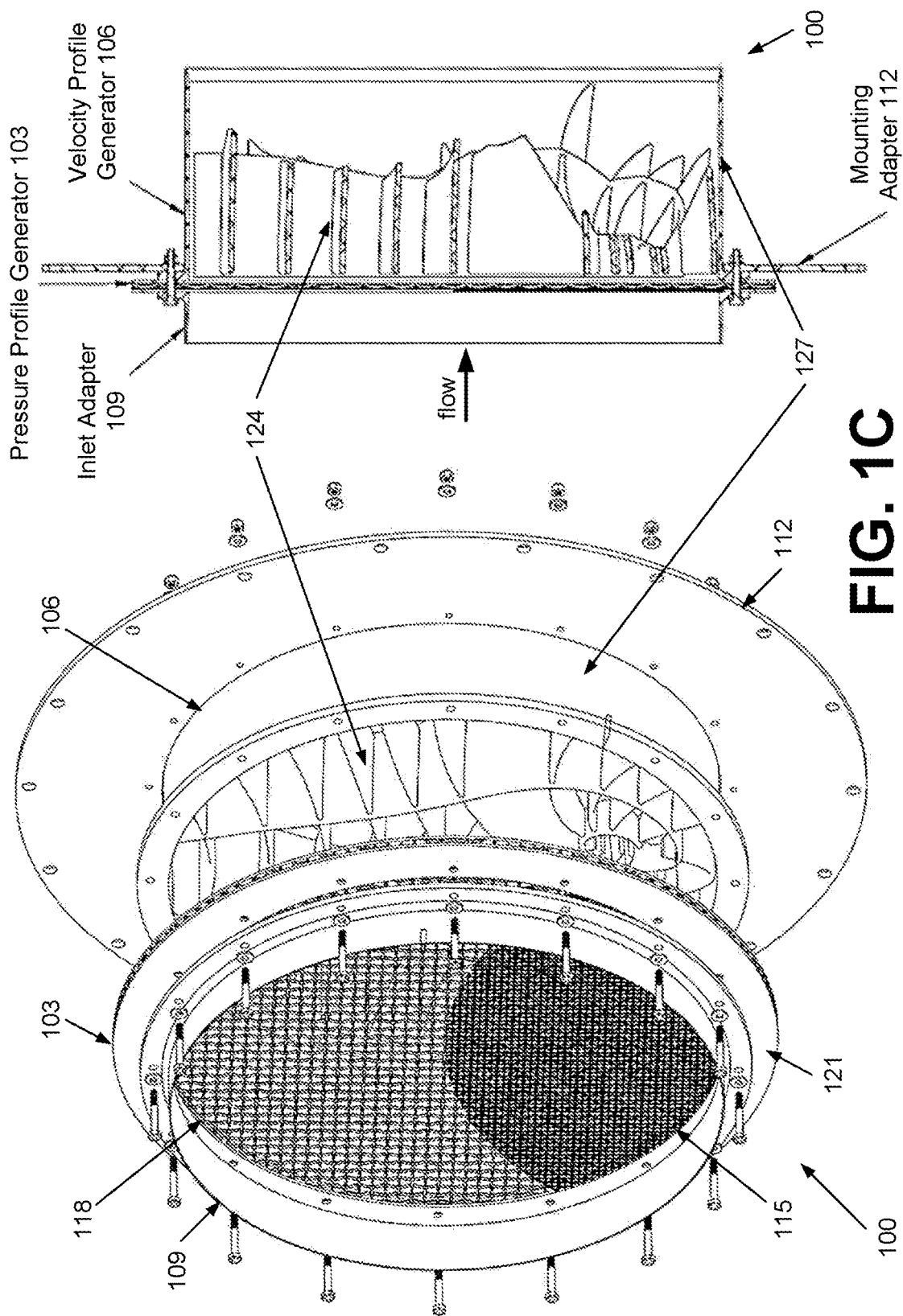

GENERALIZED FLOW PROFILE PRODUCTION

CROSS-REFERENCE TO RELATED APPLICATIONS

This application is the 35 U.S.C. 0.371 national stage application of PCT application No. PCT/US2017/031279, which claims priority to, and the benefit of, U.S. provisional application entitled "Improved Design and Manufacture of Generalized Flow Profile-Producing Devices" having Ser. No. 62/332,665, filed May 6, 2016, both of which are hereby incorporated by reference in their entireties.

STATEMENT REGARDING FEDERALLY SPONSORED RESEARCH OR DEVELOPMENT

This invention was made with government support under VT-03-01 awarded by the National Institute of Aerospace (NIA). The Government has certain rights in this invention.

BACKGROUND

Flow conditioning and flow altering devices are commonly used in research, development, design, and testing of many fluid flow applications spanning several industries and focus areas. In these applications, a flow-conditioning device that can produce a desired downstream flow field is beneficial. Currently, a single device for generating specifically tailored fluid flow profiles of combined elements of varied pressure and varied velocity does not exist.

SUMMARY

Aspects of the present disclosure are related to improved flow profile production including combinations of pressure and velocity profiles. The design, manufacture and use of flow conditioning devices are presented.

In one aspect, among others, a method comprises determining a downstream flow profile comprising a pressure profile and a velocity profile; fabricating a pressure profile generator comprising one or more distortion screens disposed on a backing structure to generate the pressure profile in a flow field of interest; fabricating a velocity profile generator comprising turning vanes in a flow path through the velocity profile generator, the turning vanes configured to generate the velocity profile in the flow field of interest; attaching the pressure profile generator to an input side of the velocity profile generator to form a flow conditioning device; and installing the flow conditioning device in the flow field of interest, where flow through the flow conditioning device produces the downstream flow profile in the flow field of interest. In one or more aspects, fabricating the pressure profile generator can comprise disposing the one or more distortion screens on the backing structure; and positioning the backing structure and one or more distortion screens between mounting plates, each mounting plate comprising an opening configured to align with the flow path through the velocity profile generator. The one or more distortion screens can comprise a plurality of layered distortion screens disposed on the backing structure, the plurality of layered distortion screens having different contour patterns that provide a variation in local porosity across an area of the backing structure. The one or more distortion screens can comprise a plurality of non-overlapping distortion screens. The plurality of non-overlapping distortion screens can comprise distortion screens having different porosities.

In one or more aspects, the method can further comprise determining a distribution of the one or more distortion screens on the backing structure using computational fluid dynamics (CFD) analysis based upon the pressure profile, the one or more distortion screens having contour patterns that provide a variation in local porosity across an area of the backing structure. The method can further comprise fabricating the one or more distortion screens using a printed contour pattern. In various aspects, the backing structure can comprise a wire mesh screen, where the one or more distortion screens are disposed on an inlet side of the wire mesh screen. The backing structure can further comprise a support frame located on an outlet side of the wire mesh screen. In one or more aspects, fabricating the velocity profile generator can comprise determining local turning angles of the turning vanes based upon the velocity profile; and producing the turning vanes based upon a computer aided design model generated from the local turning angles of the turning vanes. The turning vanes can be fabricated using advanced manufacturing techniques. The downstream flow profile can be produced in flow exiting the flow conditioning device. The method can further comprise measuring characteristics of the flow field of interest downstream of the flow conditioning device.

In another aspect, a flow conditioning device comprises a pressure profile generator comprising one or more distortion screens disposed on a backing structure, the one or more distortion screens configured to generate a pressure profile in a flow field of interest; and a velocity profile generator comprising turning vanes in a flow path through the velocity profile generator, the pressure profile generator attached to an input side of the velocity profile generator, the turning vanes configured to generate a velocity profile in the flow field of interest. In one or more aspects, the backing structure and one or more distortion screens can be positioned between mounting plates, each mounting plate comprising an opening aligned with the flow path through the velocity profile generator. The one or more distortion screens can comprise a plurality of layered distortion screens disposed on the backing structure, the plurality of layered distortion screens having different contour patterns that provide a variation in local porosity across an area of the backing structure. The one or more distortion screens can comprise a plurality of non-overlapping distortion screens. The plurality of non-overlapping distortion screens can comprise distortion screens having different porosities. In various aspects, the flow conditioning device can further comprise an inlet adapter positioned on an inlet side of the pressure profile generator, the inlet adapter extending around an inlet to the flow path. The flow conditioning device can further comprise a mounting adapter affixed to the velocity profile generator, the mounting adapter configured to secure the flow conditioning device in the flow field of interest.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A through 1C are graphical representations illustrating an example of a flow conditioning device, in accordance with various embodiments of the present disclosure.

DETAILED DESCRIPTION

Figure 1A:
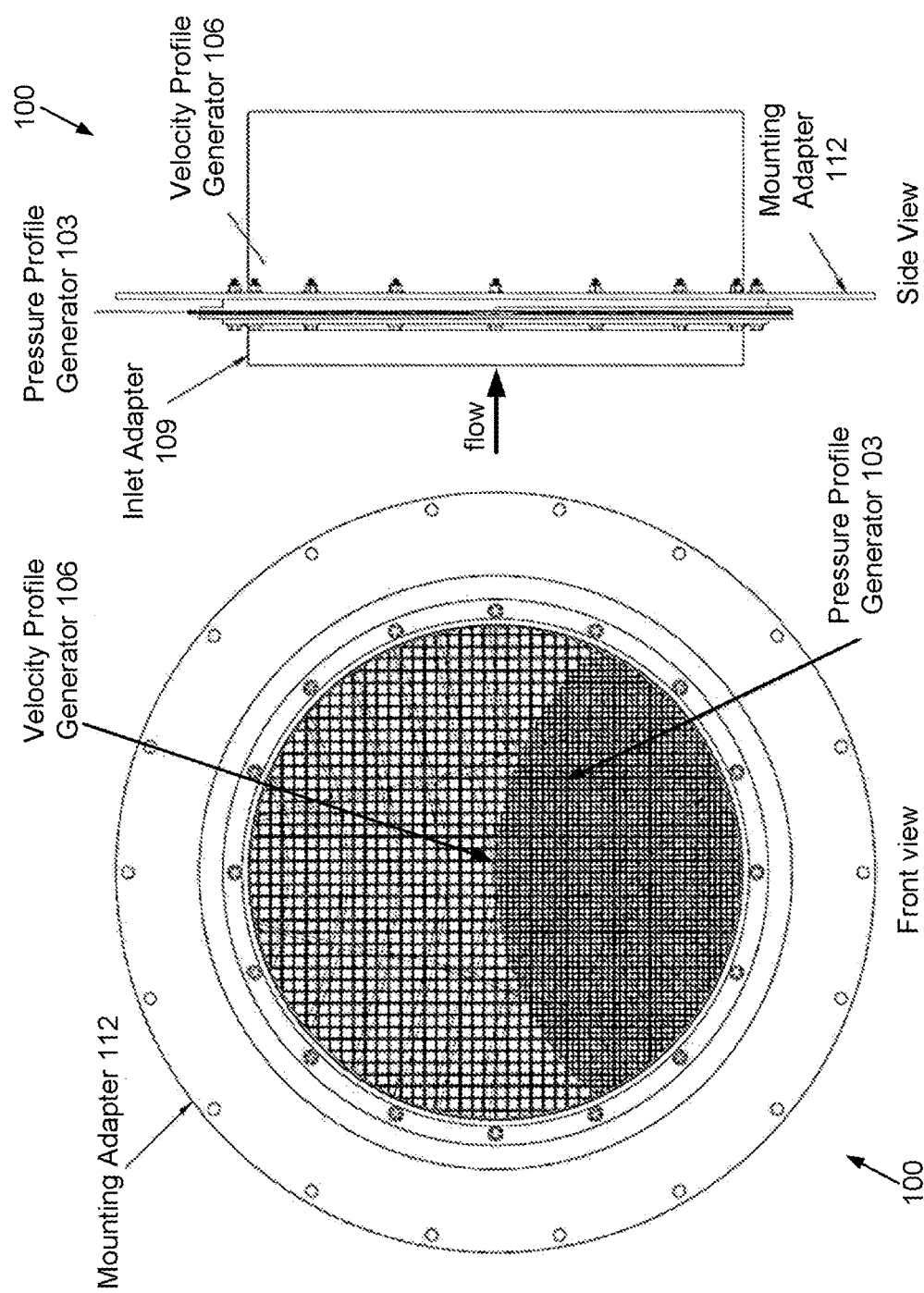

Disclosed herein are various embodiments of methods, systems, apparatus and devices related to the production and control of generalized flow profiles. This disclosure presents a method to create a single, compact device that can alter an inlet flow profile into a prescribed outlet flow profile. Reference will now be made in detail to the description of the embodiments as illustrated in the drawings, wherein like reference numbers indicate like parts throughout the several views. The detailed embodiments disclosed herein are merely exemplary, and may be embodied in various forms. The specific structural and functional details disclosed herein are not to be interpreted as limiting, but merely as a representative basis to illustrate the use and application of the disclosed methods, systems, apparatus and devices.

Wire mesh screens can be used to vary the pressure profiles within a fluid flow region. A selected porosity mesh can be applied to alter the inflow pressure to a desired, lower, outflow pressure via pressure losses within the wire mesh region. While several applications desire only a prescribed pressure profile, others may desire a prescribed combined pressure/velocity profile in the outlet flow region.

Turning vanes can be used to vary the velocity profiles within a fluid flow region. A set of airfoils or louvers can be controlled to alter the inflow velocity direction to a desired outflow velocity direction via turning vanes set to a specific angle. While several applications desire only a prescribed velocity profile, others desire a prescribed combined velocity/pressure profile in the outlet flow region.

Aircraft jet engine ground testing is an example of an application where the generation of a tailored pressure and velocity profile is desirable. Advanced airframe architecture concepts, both commercial and military, involve embedding engines within the airframe where inlet air is supplied via complex inlet ducting. The inlet duct geometry is known to generate non-uniform pressure and velocity profiles entering the inlet to the engine. In order to determine the effects of the non-uniform pressure and velocity profiles, a relatively compact device is desired which can be inserted into the flow entering the engine to generate a prescribed combined pressure/velocity profile identical to that induced by the complex inlet ducting on the production aircraft.

The flow conditioning technology is capable of generating both tailored pressure profiles and/or velocity profiles in the outlet flow of the device. This directly satisfies the desire and need to create matching inlet flow profiles for aircraft jet engine ground tests while having further use in other applications experiencing or needing a prescribed flow field. Additionally, the ability to scale the device has advantages in many industrial settings where scaled testing is more economical. For example, the flow conditioning described below can be applied to applications where specified flow characteristics are desired such as in, e.g., aviation and aerospace industries, HVAC (heating, ventilation and air conditioning) industries, research and development laboratories, or fluid applications utilizing pumps, compressors, and/or turbines. Advantages of the flow condition device include, but are not limited to, the ability to accurately produce a prescribed downstream flow profile comprising elements of uniform and/or non-uniform pressure and/or velocity profiles; the ability to produce an arbitrary downstream flow profile comprising elements of uniform and/or non-uniform pressure and/or velocity profiles; the ability to rapidly generate flow conditioning devices using advanced manufacturing techniques; the ability to economically generate flow conditioning devices of relatively compact scale; the ability to rapidly interchange pressure and/or swirl profiles leveraging on common fixture features; and/or the ability to scale for ease of testing and use with many industries.

Figure 1B:
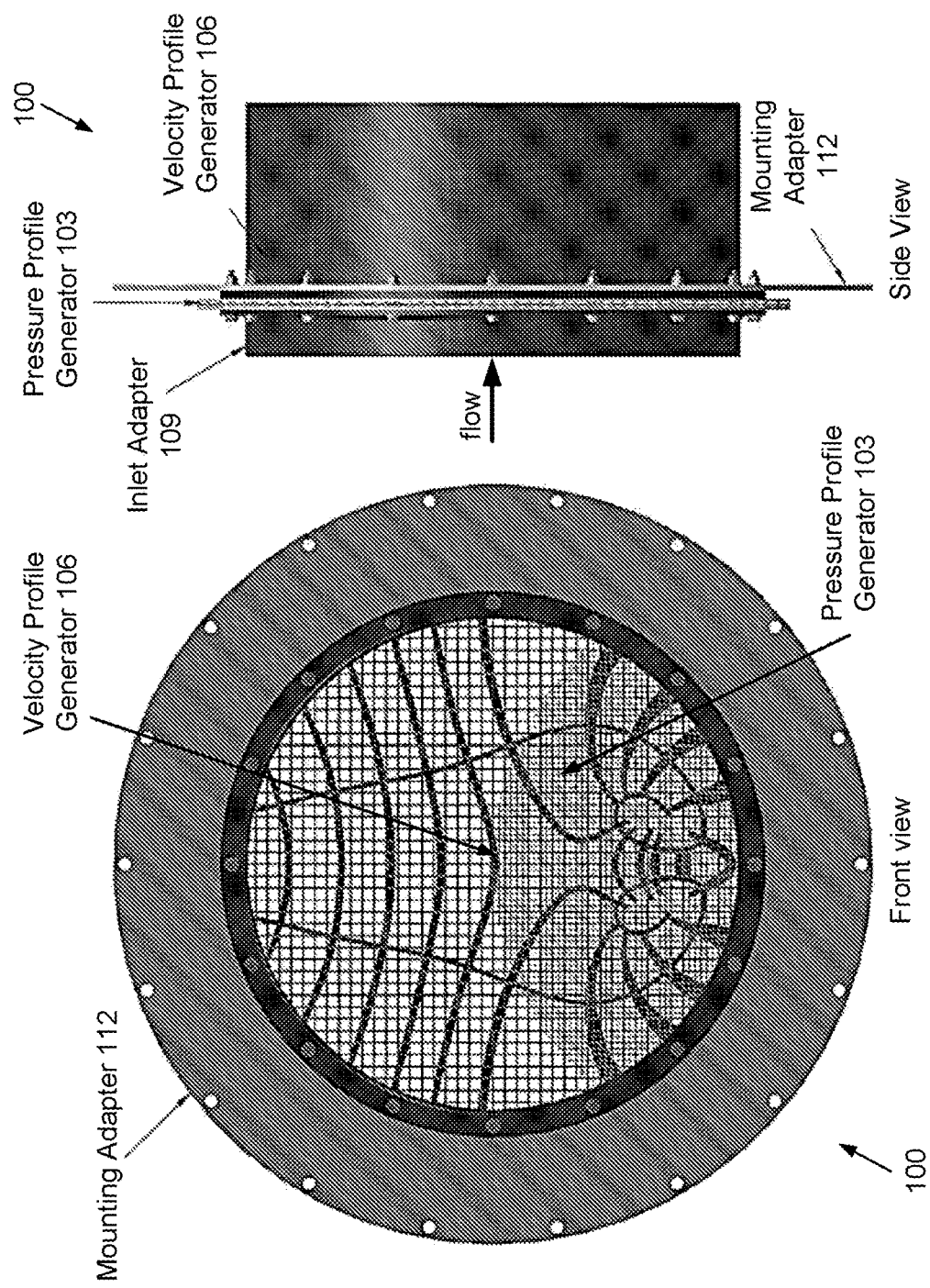

Referring to FIGS. 1A and 1B, shown is an example of a flow conditioning device 100 that can be used to tailor pressure and velocity profiles at a designated plane (the aerodynamic interface plane or AIP) downstream of the device outlet. As illustrated in FIG. 1A, the flow conditioning device 100 comprises a pressure profile generator 103 and a velocity profile generator 106. The pressure profile generator 103 can include a backing structure and one or more distortion screen(s) disposed on the backing structure. For example, the backing structure can be a wire mesh screen of relatively high porosity and high strength as shown in FIG. 1A, with one or more distortion screen(s) disposed on the upstream side of the wire mesh screen. The wire mesh screens can include relatively thick or large diameter wires (e.g., steel, stainless steel or other appropriate material) to provide the structural support needed to handle the flow conditions during operation. A relatively large spacing between the wires of the mesh can reduce the pressure drop across the wire mesh. The distortion screen(s) have lower (or finer) porosities than the wire mesh screen (or backing structure) to produce a pressure drop as the fluid flows through the distortion screen(s). The distortion screen(s) can be made of steel or stainless steel with aluminum finer weave to provide the appropriate pressure drop. Aluminum and plastic meshes can also be used.

The fluid flow passes through the pressure profile generator 103, before entering the velocity profile generator 106. The pressure profile generator 103 is configured to provide the desired pressure profile at the AIP. The velocity profile generator 106 can include turning vanes configured to redirect the fluid flow exiting the pressure profile generator 103 to achieve the desired velocity profile at the AIP. The shaded in FIG. 1B illustrates an example of the turning vanes in the velocity profile generator 106. The pattern of the turning vanes can be configured to locally control the velocity and direction of the flow to produce swirl (or other) profiles in the fluid flow. In the example of FIG. 1B, the turning vane arrangement in the lower section of the velocity profile generator 106 produces a swirling flow while the turning vanes in the upper section result in a more axial fluid flow at the output of the flow conditioning device 100.

The distortion screen(s) of the pressure profile generator 103 can be configured to locally control the pressure profile of the flow. To this end, the lower porosity distortion screen(s) can cover some or all of the turning vanes to achieve the desired result. The addition of the pressure profile generator 103 produces an increased degree of flexibility for the generation of desired flow profiles. The combination of the pressure profile generator 103 and velocity profile generator 106 produces additional degrees of design freedom, which allows local or zonal control of pressure, velocity, and/or flow direction. The flow conditioning device 100 is capable of producing any outlet flow profile including the desired total pressure and/or flow angle (or swirl) distributions.

In addition, to the pressure and velocity profile generators 103 and 106, the flow conditioning device 100 can also include an inlet adapter 109 and mounting adapter 112. The inlet adapter 109 can encircle the inlet to the pressure profile generator 103 to help provide a more uniform inlet profile. The mounting adapter 112 can be detachably attached to the velocity profile generator 106 and configured to adapt the flow conditioning device 100 to various opening sizes and shapes.

Referring to FIG. 1C, shown are exploded and cross-sectional views of the flow conditioning device 100 of FIGS. 1A and 1B. As shown in the exploded view, the pressure profile generator 103 includes a distortion screen 115 disposed on a backing structure 118 (e.g., a wire mesh screen as in FIG. 1C). In other implementations, the pressure profile generator 103 can include a plurality of distortion screens 115, which may or may not overlap to provide varying levels of porosity and thus different pressure distributions and profiles. For example, multiple layers of a distortion screen 115 may be layered to vary the pressure drop at different positions across the pressure profile generator 103. The distortion screen(s) 115 can be affixed to the backing structure 118 and/or adjacent distortion screen(s) 115 using an adhesive or other appropriate means such as stitching with wire or twine.

Front and back (or inlet and outlet) mounting plates 121 can be positioned on opposite sides of the distortion screen(s) 115 and wire mesh of the backing structure 118 to facilitate mounting of the pressure profile generator 103 to the velocity profile generator 106. Openings in the mounting plates 121 are configured to align with the inlet of the velocity profile generator 106. In some embodiments, the backing structure can include a support frame to handle higher forces produced by higher speed fluid flows through the pressure profile generator 103. For example, the support frame can comprise bracing rods or beams (e.g., steel, stainless steel, aluminum or other appropriate material) in a spoke and wheel configuration (e.g., extending radially from a central point) that is positioned behind the wire mesh opposite the distortion screen 115 to provide additional structural support. Other support frame configurations can also be utilized as can be understood. The support frame can be attached to one of the mounting plates 121 (on the inlet or outlet side) to provide support at the edge of the opening. In some cases, the wire mesh can be replaced by the support frame with the distortion screen(s) 115 disposed thereon.

As shown in the exploded and cross-sectional views of FIG. 1C, the velocity profile generator 106 includes turning vanes 124 configured to locally control the velocity and/or direction of the fluid passing through the conditioning device 100. The turning vanes 124 are positioned within a sleeve 127 to produce the desired flow velocity and/or direction. As can be seen in FIG. 1C, the turning vanes 124 extend inward from the inlet side towards the outlet of the velocity profile generator 106, and can be secured to an inner surface of the sleeve 127. The depth of the turning vanes 124 from the inlet side of the velocity profile generator is sufficient to produce the desired velocity profile. The depth of the sleeve 127 (from inlet to outlet) should be sufficient to direct the fluid flow along the entire depth of the turning vanes 124 and to protect the turning vanes 124 from inadvertent damage. The pressure profile generator 103, velocity profile generator 106, inlet adapter 109 and mounting adapter 112 can be assembled and secured together using nuts and bolts, rivets or other appropriate fasteners. The completed flow conditioning device 100 can then be mounted via the mounting adapter 112 for use in the desired application.

Next, a method to create the flow conditioning device 100 will be discussed. The flow conditioning device 100 can be designed to alter any prescribed inlet flow profile into any prescribe outlet flow profile. The prescribed inlet flow can contain uniform and/or non-uniform pressure and/or velocity profiles. The pressure profile generator 103 and velocity profile generator 106 can act on the fluid flowing through the flow conditioning device 100 to produce elements of uniform and/or non-uniform pressure and/or velocity profiles. The combination of the pressure profile generator 103 and velocity profile generator 106 provides sufficient flexibility to generate high-fidelity flow profiles downstream. Additionally, a relatively small feature size can be achieved in the generated flow profile.

Several computational modeling techniques can be utilized to determine a custom set of distortion screen(s) 115 with locally varying porosity to generate a desired downstream pressure profile. The pressure profile generator 103 can be produced by layering and/or varying the distortion screen(s) 115 in an orientation that matches the determined configuration to produce desired pressure profile. The computational modeling techniques can also be utilized to determine a custom set of turning vanes 124 (positions, geometries, orientations, etc.) with locally varying turning angle(s) to generate the desired downstream velocity profile. The velocity profile generator 106 can be produced using advanced manufacturing practices (e.g., additive manufacturing techniques) that allow for the fabrication of complex geometries. Conventional manufacturing practices (e.g., computer numerical control (CNC) machining) may also be used, but may not support fabrication of some of the complex geometries of the turning vanes 124.

With the pressure profile generator 103 positioned at the inlet to the velocity profile generator 106, the pressure profile is first created by the distortion screen(s) 115 on the backing structure 118. The altered pressure profile enters the turning vanes 124 where the velocity profile is imparted to the flow region. Because the turning vanes 124 operate identically on scaled axial velocity, the pressure field produced by the pressure profile generator 103 has negligible effect on the turning effectiveness of the turning vanes 124. The resulting fluid flow comprises the desired pressure profile as well as the desired velocity profile.

Experimental and/or computational fluid flow predictions from analysis methods (such as, e.g., full-scale engine inlet duct computational fluid dynamics (CFD)) can be used to discretely map regions of pressure and/or velocity variations to determine the appropriate pressure and velocity profile generator designs. A custom, relatively compact, flow conditioning device 100 (FIGS. 1A-1C) can then be manufactured using, e.g., wire mesh screen(s) 115 and turning vanes 124 to match the prescribed flow conditions at the plane (or AIP) downstream of the flow conditioning device 100. The combination of the distortion screen(s) 115 with turning vanes 124 produces additional degrees of design freedom which allow for local or zonal control of pressure, velocity, and flow direction. Prediction of the downstream flow conditions can be determined from the CFD analysis of the device and changes or modification made as needed to achieve the desired flow profile. The CFD analysis can be implemented using a program executed on a computing system.

The desired downstream flow profile can originate from the geometry and/or conditions of conceptual fluid flow under investigation by designers, or the downstream flow profile may be an arbitrary combination of pressure and/or velocity profiles that may not have physical meaning but may have beneficial or detrimental effects on downstream components within the flow path being evaluated. The design method allows for the generation of both realistic and invented flow profiles for further implementation and testing.

As previously discussed, CFD analysis methods can be used to determine the arrangement of the pressure profile generator 103. A layering technique can be used to fabricate the pressure profile generator 103 by varying the porosity in different regions using one or more distortion screen(s) 115. For example, the desired pressure profile can be entered as a location and pressure vector with a format of (X, Y, $P_0$), where X and Y are the coordinates in the AIP (or at the output of the pressure profile generator 103) and $P_0$ is the desired pressure at that location. From this, the local porosity, shape and/or number of screen layers can be determined based upon the CFD analysis. The distortion screen(s) 115 can then be fabricated based upon this information. For example, contour patterns can be generated to fabricate the distortion screen(s) 115. Large format printing (e.g., ink-jet or equivalent) can be used to generate contour pattern(s), which can be used to fashion the distortion screen(s) 115.

The fabrication of the pressure profile generator 103 begins by fitting a backing structure 118 of relatively high porosity and high strength to the internal dimensions of the flow path. The backing structure can comprise a wire mesh and/or a support frame with sufficient strength to withstand the forces produced by the flow through the pressure profile generator 103. One or more distortion screen(s) 115 with reduced porosity can then be attached to the backing screen in areas where reduced pressure is desired in the downstream flow. Front and back (or inlet and outlet) mounting plates 121 can then be positioned on opposite sides of the distortion screen(s) 115 and wire mesh of the backing structure 118.

Reduction of the pressure in the downstream flow is achieved by varying the porosity (reducing the porosity reduces the outlet pressure) or by layering several screens (increasing the number of layers reduces the outlet pressure).

Figure 2A:
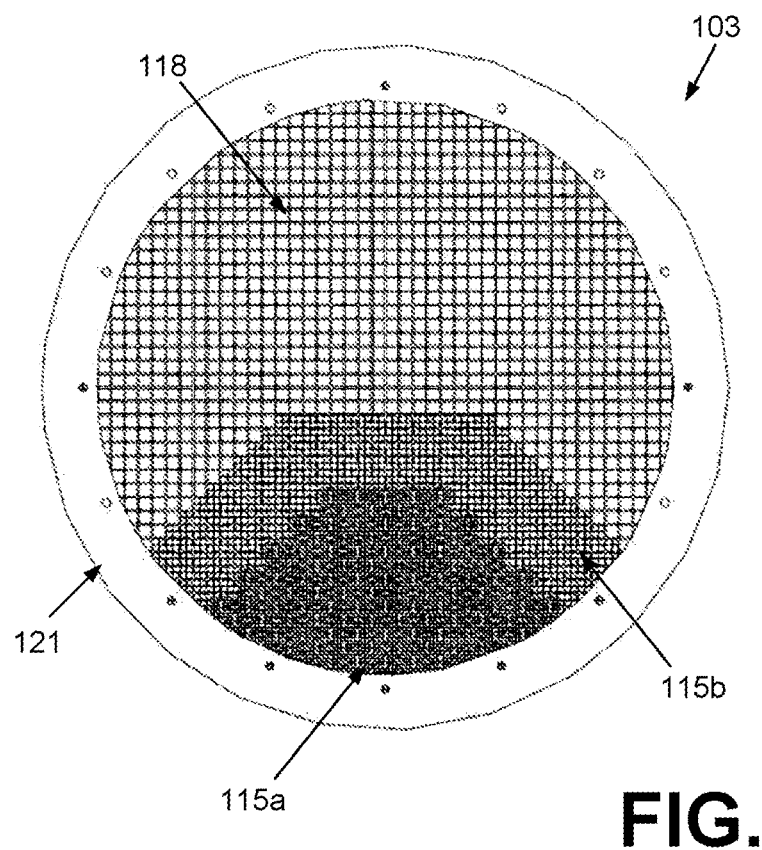
FIGS. 2A and 2B are graphical representations illustrating an example of a pressure profile generator of the flow conditioning device of FIGS. 1A-1C and its pressure profile, in accordance with various embodiments of the present disclosure.
Figure 2B:
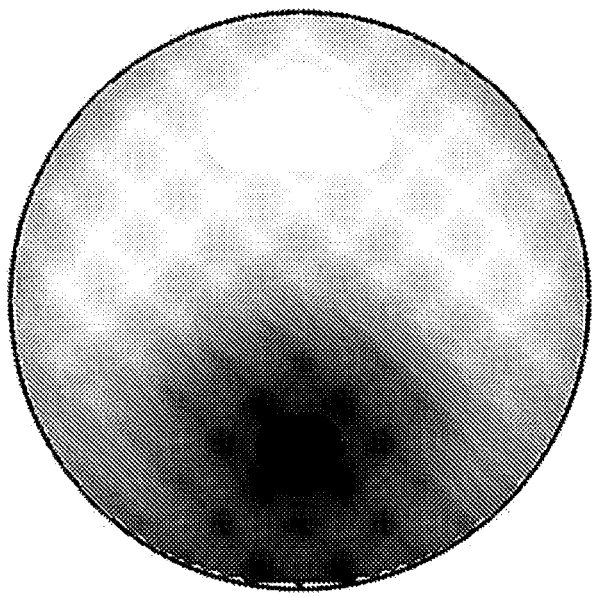

Referring to FIG. 2A, shown is an example of two distortion screens 115a and 115b disposed on the wire mesh of the backing structure 118. By layering the distortion screens 115, the pressure is reduced to three levels. A first pressure level is produced at the output of the pressure profile generator 103 by the mesh screen of the backing structure 118 that is not covered by the distortion screens 115. A lower pressure level is produced in the area covered by distortion screen 115a and not covered by distortion screen 115b, and the lowest pressure level is produced in the area covered by both distortion screens 115a and 115b. FIG. 2B illustrates the total pressure recovery factor at the outlet of the pressure profile generator 103, with the lowest pressures shown in black and the highest pressures shown in white. While the example of FIGS. 2A and 2B show distortion screens 115 positioned in the lower section of the pressure profile generator 103, distortion screens 115 can be arranged in different configurations on the backing structure 118 as can be appreciated.

As previously discussed, CFD analysis methods can be used to determine the arrangement of the velocity profile generator 106. The desired velocity profile can be specified as a location and velocity vector input of the format (X, Y, U, V, W), where X and Y are the coordinates in the AIP (or at the output of the velocity profile generator 106) and U, V and W specify the velocity vector at that location. From this, the local turning angle for the turning vanes 124 can be determined. An intuitive method of placing turning vanes can be conducted to arrange the geometry to achieve the local output velocity profile (both in magnitude and direction). A computer aided design (CAD) model of the custom turning vane arrangement can be generated from the determined information using a program executed by a computing system. The CAD information can then be used to fabricate the turning vanes 124 using advanced manufacturing techniques (e.g., additive manufacturing) and/or conventional manufacturing techniques (e.g., CNC).

Figure 3A:
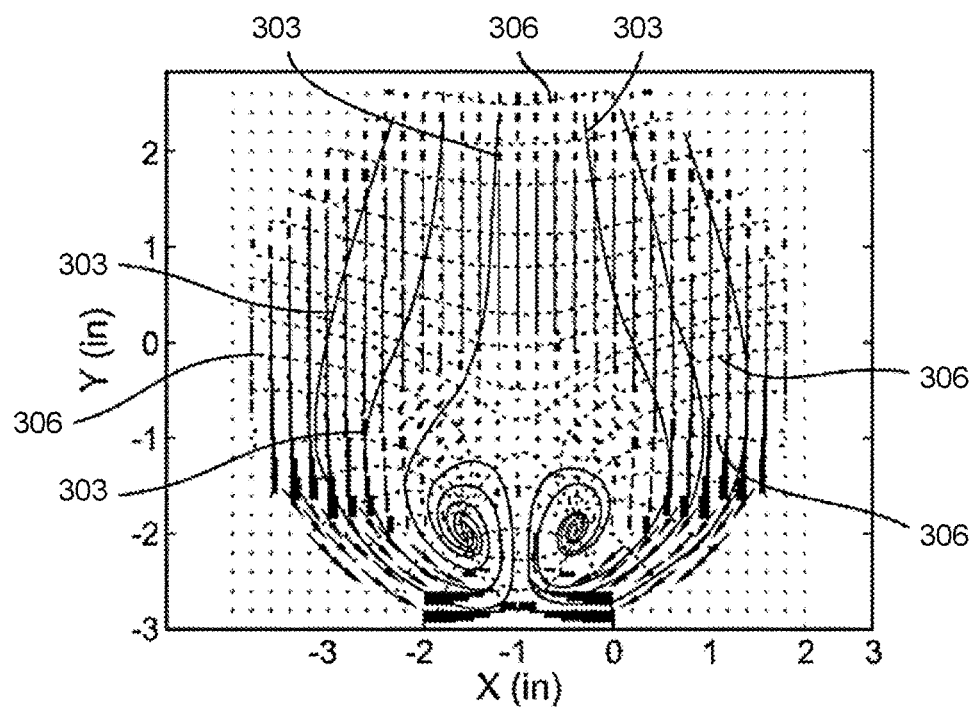
FIGS. 3A through 3C illustrate an example of the design of a turning vane arrangement of a velocity profile generator, in accordance with various embodiments of the present disclosure.

In inlet flow distortion analysis, the goal is to duplicate the desired flow in a real installation at a designated plane, or AIP. This plane can, e.g., serve as the coupling between an airframe and an engine. Once the desired velocity profile is chosen at the AIP, the desired velocity profile at its trailing edge from an assumed uniform inlet velocity profile is generated. FIG. 3A illustrates an example of the velocity vectors taken from a flow profile, where the solid lines, some of which are designated as 303, are everywhere parallel to the in-plane flow, while the dashed lines, some of which are designated as 306, are everywhere perpendicular. The distance to the nearest or two nearest neighboring lines can then be determined at regular intervals. The vane spacing and desired turning angle at each blade location can be determined as described in U.S. Patent App. Pub. No. 2016/0012159, which is hereby incorporated by reference in its entirety. Using this information, the vane angle of attack and camber line needed to produce the desired turning is determined.

Figure 3B:
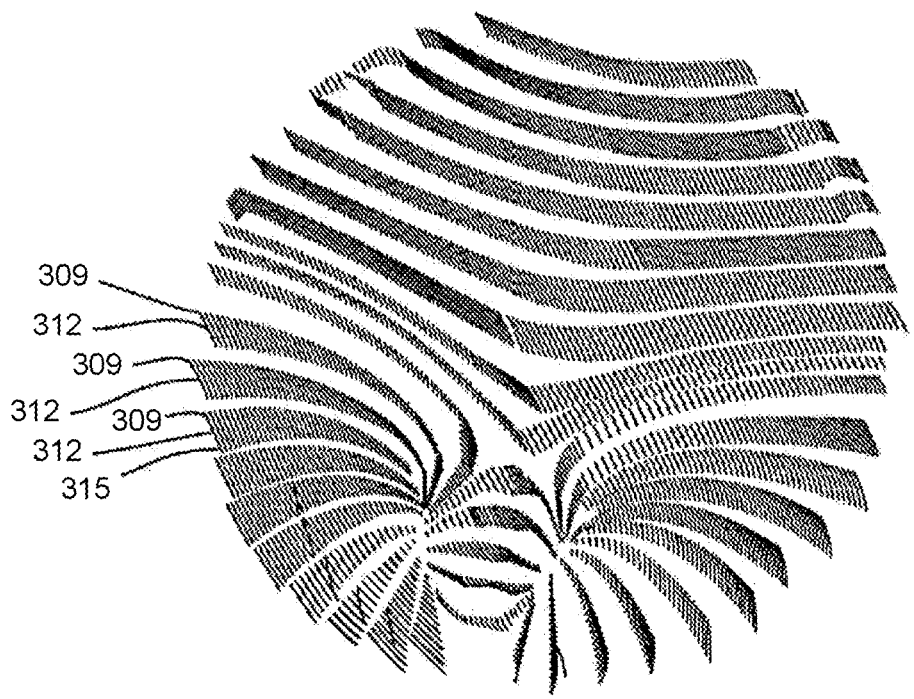
Figure 3C:
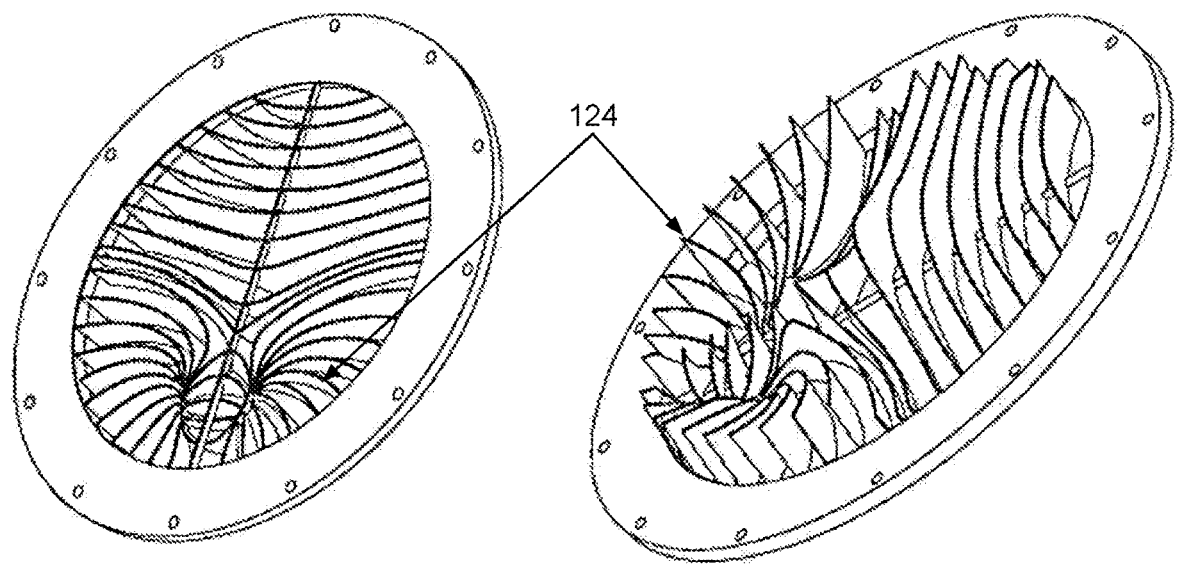

The blade profiles and blade lines may then be exported to a CAD package. FIG. 3B shows an example of the vane lines and profiles after export, with leading edge blade lines 309, a plurality of defining blade profile lines 312, and the trailing edge blade line 315 which is formed by the end of the blade profiles. The blade profiles can be swept along their corresponding vane lines to create solid bodies. These solid blade bodies can then be joined at vortex centers, with structure and flanging added as needed. An example of the turning vane arrangement is shown in FIG. 3C.

Figure 4A:
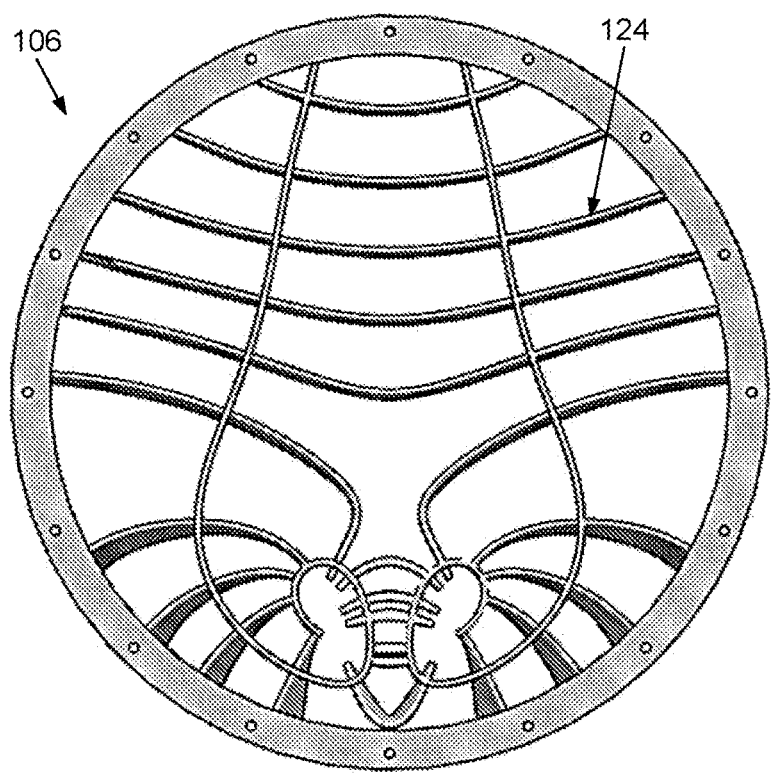
FIGS. 4A and 4B are graphical representations illustrating an example of a velocity profile generator of the flow conditioning device of FIGS. 1A-1C and its velocity profile, in accordance with various embodiments of the present disclosure.
Figure 4B:
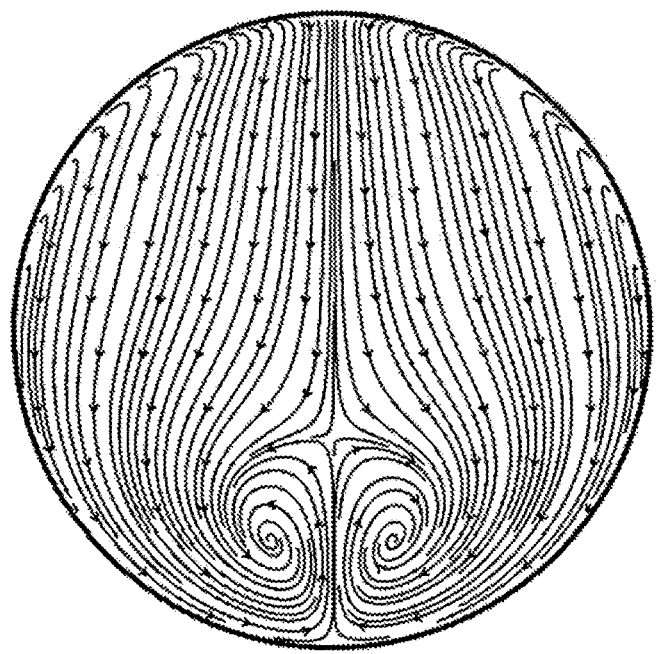
Figure 4C:
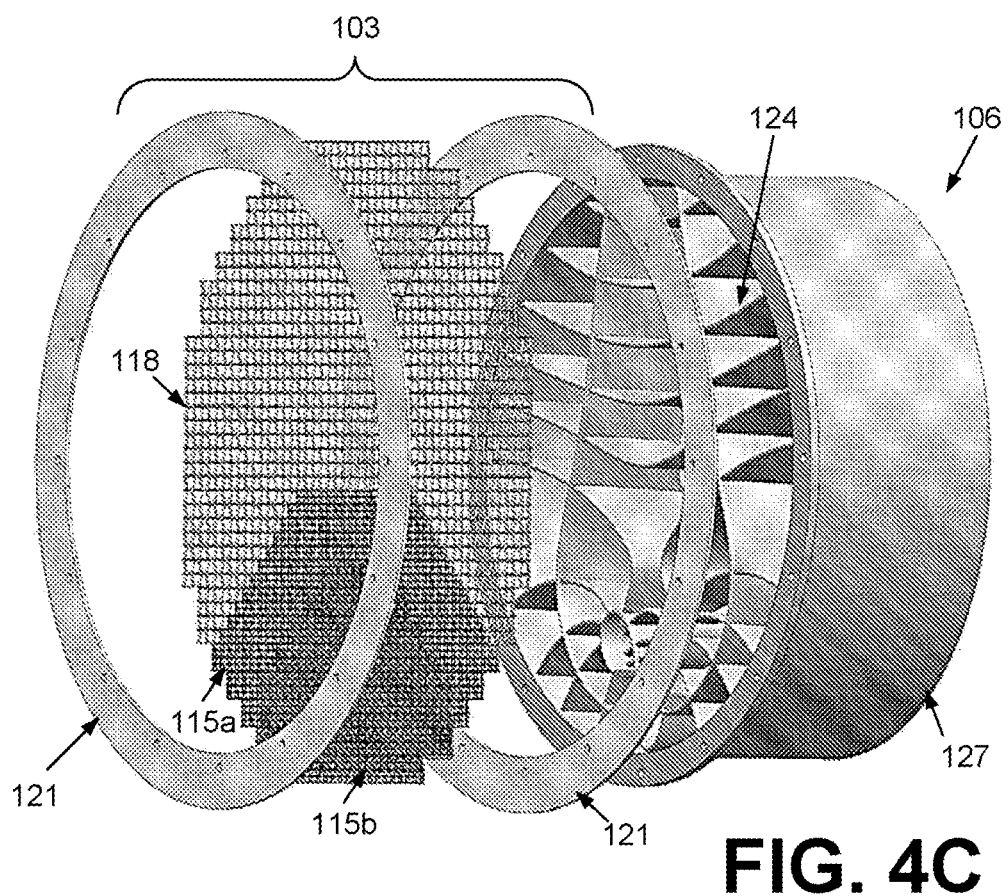
FIG. 4C is an exploded view illustrating the assembly of the pressure profile generator of FIG. 2A and the velocity profile generator of FIG. 4A, in accordance with various embodiments of the present disclosure.

Referring to FIG. 4A, shown is an example of the turning vane arrangement for the velocity profile generator 106 of FIGS. 1A-1C. FIG. 4B illustrates the flow velocity profile produced by the turning vane arrangement of FIG. 4A. As can be seen, the turning vanes 124 in the lower section of the velocity profile generator 106 produces a swirling flow while the turning vanes 124 in the upper section result in a more uniform fluid flow. FIG. 4C is an exploded view illustrating the assembly of the pressure profile generator 103 of FIG. 2A with the velocity profile generator 106 including the turning vane arrangement of FIG. 4A. The pressure profile generator 103 can be fabricated according to the process outlined above. The velocity profile generator 106 can be fabricated via, e.g., additive manufacturing techniques as outlined above. The additive manufacturing techniques can account for the complex geometries of the custom turning vanes 124. While the example of FIG. 4C illustrates the assembly with separate pressure and velocity profile generators 103 and 106, in some embodiments the pressure and velocity profile generators 103 and 106 may be implemented as a single unit. Additive manufacturing techniques can be used to form the turning vanes 124 on the backing structure 118, or may even be used to fabricate the backing structure 118 with materials having appropriate properties (strength) and/or fidelity (resolution) and/or scale (size) for the application.

Testing of a flow conditioning device 100 has been conducted in both wind-tunnel experiments and jet engine ground test experiments. Three-dimensional flow probes were used to measure the local pressure and velocity (magnitude and direction) in the flow downstream of the flow conditioning device 100. Additionally, three-dimensional optical flow measurements were used to measure the local velocity (magnitude and direction) in the flow downstream of the flow conditioning device 100. Results showed that the flow conditioning device 100 was capable of generating the desired pressure and velocity profiles at the exit plane of the velocity profile generator 106. The fluid flow naturally mixes and develops in the downstream flow region according to viscous fluid dynamics and vortex development and propagation.

Computational analysis demonstrated that the desired flow conditions exist at the exit plane of the velocity profile generator 106 and experimental measurements taken further downstream matched predicted values. Prediction of the downstream flow conditions provides the ability to design a custom combination of pressure profile generator 103 and velocity profile generator 106 that can produce a desired pressure and/or velocity profile at an arbitrary distance downstream of the flow conditioning device 100.

A method has been presented for creating a flow conditioning device 100 that can be configured to alter any arbitrary uniform and/or non-uniform inlet pressure and/or velocity profile into any arbitrary uniform and/or non-uniform inlet pressure and/or velocity profile. The method can comprise, but is not limited to, obtaining and/or generating a desired downstream flow profile comprising elements of uniform and/or non-uniform pressure and/or velocity profiles. A pressure profile generator 103 can be fabricated to generate the desired downstream pressure profile. The local porosity and/or number of distortion screen layers can be calculated to generate the desired downstream pressure profile. Large format printing (ink-jet or equivalent) can be used to generate a contour pattern of local porosity and/or number of distortion screen layers for ease of fabrication at the desired scale. A backing screen of relatively high porosity and high strength can be fit to the internal dimensions of the flow path and varying porosity and/or varying number of distortion screen layers can be attached to the backing screen according to the calculations.

A velocity profile generator 106 can be fabricated to generate the desired downstream velocity profile. The local turning angle can be calculated to angle the turning vanes to generate the desired downstream velocity profile. A computer aided design (CAD) model of the custom turning vanes can be output and used to produce the turning vanes via conventional (CNC) and/or advanced (additive) manufacturing techniques. The pressure profile generator 103 can be assembled to the inlet side of the velocity profile generator 106, and the flow conditioning device 100 can be installed into the flow field of interest. Characteristics of the flow field downstream of the flow conditioning device 100 can be measured after installation. The flow conditioning device can generate a custom, tailored pressure profile matching the desired pressure profile and/or a custom, tailored velocity profile matching the desired velocity profile in the flow exiting the flow conditioning device 100.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method, comprising:
   determining a downstream flow profile comprising a pressure profile and a velocity profile;
   fabricating a pressure profile generator comprising one or more distortion screens disposed on a backing structure to generate the pressure profile in a flow field of interest;
   fabricating a velocity profile generator comprising turning vanes in a flow path through the velocity profile generator, the turning vanes configured to generate the velocity profile in the flow field of interest;

attaching the pressure profile generator to an input side of the velocity profile generator to form a flow conditioning device; and installing the flow conditioning device in the flow field of interest, where flow through the flow conditioning device produces the downstream flow profile in the flow field of interest.

2. The method of claim 1, wherein fabricating the pressure profile generator comprises:

disposing the one or more distortion screens on the backing structure; and positioning the backing structure and one or more distortion screens between mounting plates, each mounting plate comprising an opening configured to align with the flow path through the velocity profile generator.

3. The method of claim 2, wherein the one or more distortion screens comprise a plurality of layered distortion screens disposed on the backing structure, the plurality of layered distortion screens having different contour patterns that provide a variation in local porosity across an area of the backing structure.

4. The method of claim 2, wherein the one or more distortion screens comprise a plurality of non-overlapping distortion screens.

5. The method of claim 4, wherein the plurality of non-overlapping distortion screens comprise distortion screens having different porosities.

6. The method of claim 1, further comprising determining a distribution of the one or more distortion screens on the backing structure using computational fluid dynamics (CFD) analysis based upon the pressure profile, the one or more distortion screens having contour patterns that provide a variation in local porosity across an area of the backing structure.

7. The method of claim 6, further comprising fabricating the one or more distortion screens using a printed contour pattern.

8. The method of claim 1, wherein the backing structure comprises a wire mesh screen, where the one or more distortion screens are disposed on an inlet side of the wire mesh screen.

9. The method of claim 8, wherein the backing structure further comprises a support frame located on an outlet side of the wire mesh screen.

10. The method of claim 1, wherein fabricating the velocity profile generator comprises:

determining local turning angles of the turning vanes based upon the velocity profile; and producing the turning vanes based upon a computer aided design model generated from the local turning angles of the turning vanes.

11. The method of claim 10, wherein the turning vanes are fabricated using advanced manufacturing techniques.

12. The method of claim 1, wherein the downstream flow profile is produced in flow exiting the flow conditioning device.

13. The method of claim 1, further comprising measuring characteristics of the flow field of interest downstream of the flow conditioning device.

14. A flow conditioning device, comprising:

a pressure profile generator comprising one or more distortion screens disposed on a backing structure, the one or more distortion screens configured to generate a pressure profile in a flow field of interest; and a velocity profile generator comprising turning vanes in a flow path through the velocity profile generator, the pressure profile generator attached to an input side of the velocity profile generator, the turning vanes configured to generate a velocity profile in the flow field of interest.

15. The flow conditioning device of claim 14, wherein the backing structure and one or more distortion screens are positioned between mounting plates, each mounting plate comprising an opening aligned with the flow path through the velocity profile generator.

16. The flow conditioning device of claim 14, wherein the one or more distortion screens comprise a plurality of layered distortion screens disposed on the backing structure, the plurality of layered distortion screens having different contour patterns that provide a variation in local porosity across an area of the backing structure.

17. The flow conditioning device of claim 14, wherein the one or more distortion screens comprise a plurality of non-overlapping distortion screens.

18. The flow conditioning device of claim 17, wherein the plurality of non-overlapping distortion screens comprise distortion screens having different porosities.

19. The flow conditioning device of claim 14, further comprising an inlet adapter positioned on an inlet side of the pressure profile generator, the inlet adapter extending around an inlet to the flow path.

20. The flow conditioning device of claim 14, further comprising a mounting adapter affixed to the velocity profile generator, the mounting adapter configured to secure the flow conditioning device in the flow field of interest.

* * * * *